US010427232B2

(12) United States Patent
Nishikawa et al.

(10) Patent No.: US 10,427,232 B2
(45) Date of Patent: Oct. 1, 2019

(54) WIRE ELECTRICAL DISCHARGE MACHINE

(71) Applicant: FANUC CORPORATION, Yamanashi (JP)

(72) Inventors: Ryou Nishikawa, Yamanashi-ken (JP); Yasuo Hasegawa, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 178 days.

(21) Appl. No.: 15/651,271

(22) Filed: Jul. 17, 2017

(65) Prior Publication Data

US 2018/0021869 A1 Jan. 25, 2018

(30) Foreign Application Priority Data

Jul. 21, 2016 (JP) ................. 2016-143127

(51) Int. Cl.
B23H 1/02 (2006.01)
B23H 1/06 (2006.01)
B23H 1/08 (2006.01)
B23H 1/10 (2006.01)
B23H 7/02 (2006.01)
B23H 7/08 (2006.01)
B23H 7/20 (2006.01)
B01D 35/02 (2006.01)
B01D 37/04 (2006.01)
B01D 35/143 (2006.01)

(52) U.S. Cl.
CPC .............. B23H 1/02 (2013.01); B01D 35/02 (2013.01); B01D 35/143 (2013.01); B01D 37/048 (2013.01); B23H 1/06 (2013.01); B23H 1/08 (2013.01); B23H 1/10 (2013.01); B23H 7/08 (2013.01); B23H 7/20 (2013.01); B23H 7/02 (2013.01); B23H 2500/20 (2013.01)

(58) Field of Classification Search
CPC ... B23H 1/02; B23H 1/06; B23H 1/10; B23H 7/20; B23H 1/08; B23H 7/08; B23H 2500/20; B23H 7/02; B01D 35/02; B01D 35/143; B01D 37/048
USPC ........................................................ 700/162
See application file for complete search history.

(56) References Cited

U.S. PATENT DOCUMENTS 4,532,045 A * 7/1985 Littmann ............... B01D 35/02
210/167.32
4,857,688 A 8/1989 Aso et al.
(Continued)

FOREIGN PATENT DOCUMENTS

CN 201565683 U 9/2010
CN 204234926 U 4/2015
(Continued)

OTHER PUBLICATIONS

English Abstract and Machine Translation for German Publication No. 3535546 A1, published Apr. 10, 1986, 7 pgs.
(Continued)

Primary Examiner — Ziaul Karim
(74) Attorney, Agent, or Firm — Fredrikson & Byron, P.A.

(57) ABSTRACT

A wire electrical discharge machine includes a filter for removing machined swarf produced by electrical discharge machining from a working fluid, and a heating device for heating the working fluid stored inside the filter.

15 Claims, 6 Drawing Sheets

(56) References Cited

U.S. PATENT DOCUMENTS

| | | | | |
|---|---|---|---|---|
| 5,171,359 A | * | 12/1992 | Megy | C22B 1/248 419/10 |
| 5,597,401 A | * | 1/1997 | Megy | B22F 8/00 134/2 |
| 2004/0149634 A1 | * | 8/2004 | Hughes | A23L 2/39 210/96.1 |

FOREIGN PATENT DOCUMENTS

| | | | |
|---|---|---|---|
| DE | 3535546 | A1 | 4/1986 |
| JP | 5743932 | U | 3/1982 |
| JP | 5914431 | A | 1/1984 |
| JP | 61297033 | A | 12/1986 |
| JP | 6342981 | Y2 | 11/1988 |
| JP | 3190627 | A | 8/1991 |
| JP | 20058480 | A | 1/2005 |

OTHER PUBLICATIONS

English Abstract and Machine Translation for Japanese Publication No. 59-014431 A, published Jan. 25, 1984, 9 pgs.

European Search Report and Written Opinion dated Jan. 8, 2018 for related EP Application No. 17001233.0, 15 pgs.

English Abstract and Machine Translation for Japanese Publication No. 03-190627 A, published Aug. 20, 1991, 5 pgs.

English Abstract and Machine Translation for Japanese Publication No. 57-043932 U, published Mar. 10, 1982, 6 pgs.

English Machine Translation of Notification of Reasons for Refusal dated Jun. 19, 2018 from corresponding Japanese Application No. 2016-143127, 3 pgs.

Untranslated Notification of Reasons for Refusal dated Jun. 19, 2018 from corresponding Japanese Application No. 2016-143127, 4 pgs.

English Machine Translation of JP Decision to Grant dated Aug. 28, 2018 from corresponding Japanese Application No. 2016-143127, 3 pgs.

Untranslated JP Decision to Grant dated Aug. 28, 2018 from corresponding Japanese Application No. 2016-143127, 3 pgs.

English Abstract and Machine Translation for Japanese Publication No. 2005-008480 A, published Jan. 13, 2005, 6 pgs.

English Abstract and Machine Translation for Japanese Publication No. 61-297033 A, published Dec. 27, 1986, 6 pgs.

English Abstract and Machine Translation for Chinese Publication No. 204234926 U, published Apr. 1, 2015, 12 pgs.

English Abstract and Machine Translation for Chinese Publication No. 201565683 U, published Sep. 1, 2010, 9 pgs.

* cited by examiner

WIRE ELECTRICAL DISCHARGE MACHINE

CROSS-REFERENCE TO RELATED APPLICATION

This application is based upon and claims the benefit of priority from Japanese Patent Application No. 2016-143127 filed on Jul. 21, 2016, the contents of which are incorporated herein by reference.

BACKGROUND OF THE INVENTIONH

Field of the Invention

The present invention relates to a wire electrical discharge machine that performs electrical discharge machining on a workpiece in a working fluid.

Description of the Related Art:

Recently, materials containing magnesium have been widely used in automotive application (automobiles), IT equipment and the like in order to reduce the weight of parts. For this reason, the wire electrical discharge machine in which electric current is flowed through a wire electrode to perform electrical discharge machining has become required to deal with workpieces containing magnesium. Though the wire electrical discharge machine can machine objects containing magnesium easily, the machining process entails safety problems of machined swarf (chips) produced by machining.

The machined chips containing magnesium are very fine and have high chemical reactivity, but they, forming a passive film in the dielectric working fluid, are unlikely to react with air. Nevertheless, once water or fluid runs out around the machined swarf containing magnesium, they will react with oxygen ($O_2$) and carbon dioxide ($CO_2$) in the air and oxidize. When magnesium oxidizes forming magnesium oxide, this reaction gives off intense heat (intense heat of reaction). The reaction formula of formation of magnesium oxide is as follows:

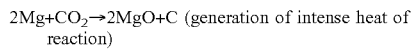
$2Mg+CO_2 \rightarrow 2MgO+C$ (generation of intense heat of reaction)

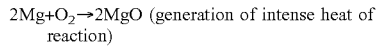
$2Mg+O_2 \rightarrow 2MgO$ (generation of intense heat of reaction)

The amount of machined swarf (magnesium) adhering to the tanks (pans) or piping of the wire electrical discharge machine will hardly cause problems involving heat of reaction. However, since the filter for collecting the machined swarf contains a large amount of magnesium therein, this causes heat reaction problem. For example, when water or fluid in the filter is taken out for such a work as replacing filters, a large amount of magnesium in the filter is oxidized so that intensive reaction heat is generated, which may lead to ignition of the filter.

To deal with this problem, Japanese Laid-Open Patent Publication No. 2005-008480 discloses a method whereby fine magnesium particles are dissolved in an acid solution, an alkaline solution is added to form magnesium hydroxide, which is then flocculated and sedimented with a flocculating agent and further dehydrated.

SUMMARY OF THE INVENTION

However, in Japanese Laid-Open Patent Publication No. 2005-008480, in order to flocculate and collect magnesium, the solution containing magnesium powder must be made acidic or alkaline. If this method is applied to a wire electrical discharge machine, the working fluid must be made acidic or alkaline, which would cause corrosion problems of the wire electrical discharge machine and the workpiece and also make electric conductivity too high. Therefore, it is difficult to apply this method to wire electrical discharge machines.

It is therefore an object of the present invention to provide a wire electrical discharge machine that suppresses oxidation of machining debris generated by machining.

The present invention resides in a wire electrical discharge machine for performing electrical discharge machining on a workpiece to be machined in a working fluid of deionized water, including: a filter configured to remove machined swarf produced by electrical discharge machining from the working fluid; and a heating device configured to heat the working fluid stored inside the filter.

This configuration makes it possible to heat the working fluid contained in the filter, whereby it is possible to cause reaction between the machined swarf adhered to the filter and the heated working fluid. This machined swarf which has reacted with the heated working fluid becomes unlikely to oxidize. It is hence possible to prevent ignition of the filter even when the filter is dried.

According to the present invention, the wire electrical discharge machine may include a storage tank configured to accommodate the filter, and may be constructed such that the heating device is configured to heat the working fluid stored in the storage tank. Accordingly, when the working fluid stored in the storage tank is heated, it is possible to easily heat the stored working fluid stored inside the filter.

In the present invention, the wire electrical discharge machine may further include: a work tank configured to store the working fluid in order to perform electrical discharge machining; and a dirty fluid tank configured to temporarily store the working fluid containing the machined swarf, discharged from the work tank, and may be constructed such that the heating device is configured to heat the working fluid containing the machined swarf, stored in, at least, one of the work tank and the dirty fluid tank. Since this configuration makes it possible to heat the working fluid containing machined swarf before the working fluid containing machined swarf flows into the filter, the machined swarf that is hardly oxidized adheres to the filter. As a result, it is possible to prevent the filter from igniting even if the filter is dried.

In the present invention, the wire electrical discharge machine may further include: a work tank configured to store the working fluid to perform electrical discharge machining; a dirty fluid tank configured to temporarily store the working fluid containing the machined swarf, discharged from the work tank; and a duct configured to connect the dirty fluid tank and the filter in order to flow the working fluid from the dirty fluid tank to the filter, and may be constructed such that the heating device is configured to further heat the working fluid in the duct. Since this configuration makes it possible to heat the working fluid containing machined swarf before the working fluid containing machined swarf flows into the filter, the machined swarf that is hardly oxidized adheres to the filter. As a result, it is possible to prevent the filter from igniting even if the filter is dried.

In the present invention, the wire electrical discharge machine may be constructed such that the storage tank includes a shutter configured to either store or not store the working fluid, and is configured to store the working fluid therein by closing the shutter at time of heating by the heating device so as to immerse the filter in the working fluid. In this way, since the working fluid contained in the filter can be heated easily, it is possible to react the machined swarf adhered to the filter with the heated working fluid.

In the present invention, the wire electrical discharge machine may be constructed such that the storage tank is a clean fluid tank configured to store the working fluid with the machined swarf removed by the filter. This makes it easy to heat the working fluid contained in the filter, so that the machined swarf adhered to the filter can be reacted with the heated working fluid. Further, the configuration of the wire electrical discharge machine can be simplified, leading to a reduced cost.

In the present invention, the wire electrical discharge machine may be constructed such that the heating device is configured to heat the working fluid up to, at least, a predetermined temperature at which magnesium contained in the machined swarf in the working fluid changes to magnesium hydroxide. This makes it possible to reliably prevent the machined swarf from being oxidized, and provide reliable prevention against ignition of the filter.

In the present invention, the wire electrical discharge machine may be constructed such that the heating device includes a heating element configured to heat the working fluid using heat from the heating element. Thereby, it is possible to heat the working fluid easily.

In the present invention, the wire electrical discharge machine may be constructed such that the heating device is configured to heat the working fluid in the wire electrical discharge machine by supplying the working fluid having a temperature equal to or higher than a predetermined temperature, which is higher than a temperature of the working fluid in the wire electrical discharge machine, to the wire electrical discharge machine. This configuration makes it possible to easily heat the working fluid and also reduce the concentration of the machined swarf content in the working fluid of the wire electrical discharge machine.

In the present invention, the wire electrical discharge machine may further include a control device configured to control operation of the heating device, and may be constructed such that when an operator performs control of turning off power to the wire electrical discharge machine, the control device is configured to actuate the heating device to start heating the working fluid, and when a predetermined time elapses from start of heating, or when a temperature of the working fluid reaches a predetermined temperature or higher, the control device is configured to stop the operation of the heating device to terminate heating of the working fluid and is configured to turn off the power to the wire electrical discharge machine. This configuration makes it possible to prevent ignition of the filter even when the filter is dried by turning off the power supply. Further, it is possible to save the electricity charges and prevent the machining accuracy in electrical discharge machining from being lowered by the heating of the working fluid.

In the present invention, the wire electrical discharge machine may further include a control device configured to control operation of the heating device, and may be constructed such that when an operator performs control of giving an instruction to replace the filter, the control device is configured to actuate the heating device to start heating the working fluid, and when a predetermined time elapses from start of heating, or when a temperature of the working fluid reaches a predetermined temperature or higher, the control device is configured to stop the operation of the heating device to terminate the heating of the working fluid and is configured to notify the operator that the filter can be replaced. Thereby, the filter is replaced after being heated, so that the used filter taken out by replacement can be prevented from igniting as a result of being dried. Further, it is possible to save the electricity charges and prevent the machining accuracy in electrical discharge machining from being lowered by the heating of the working fluid.

In the present invention, the wire electrical discharge machine may further include: a control device configured to control operation of the heating device; and a concentration detector configured to detect concentration of machined swarf in the working fluid, and may be constructed such that when the concentration detector detects a concentration equal to or higher than a threshold, the control device is configured to actuate the heating device to start heating of the working fluid, and when a predetermined time elapses from start of heating, or when a temperature of the working fluid reaches a predetermined temperature or higher, the control device is configured to stop the operation of the heating device to terminate the heating of the working fluid. In this way, since the working fluid is heated only when there is a risk of the filter igniting unless the working fluid is heated, it is possible to save the electricity charges and prevent the machining accuracy in electrical discharge machining from being lowered by the heating of the working fluid.

In the present invention, the wire electrical discharge machine may further include a control device configured to control operation of the heating device, and may be constructed such that when an alarm for stopping operation of the wire electrical discharge machine is raised, the control device is configured to actuate the heating device to start heating of the working fluid, and when a predetermined time elapses from start of heating, or when a temperature of the working fluid reaches a predetermined temperature or higher, the control device is configured to stop the operation of the heating device to terminate the heating of the working fluid. This configuration makes it possible to prevent ignition of the filter even when the filter is dried by turning off the power supply. Further, it is possible to save the electricity charges and prevent the machining accuracy in electrical discharge machining from being lowered by the heating of the working fluid.

In the present invention, the wire electrical discharge machine may further include a control device configured to control operation of the heating device, and may be constructed such that when a machining condition for machining the workpiece containing magnesium is selected by an operator, the control device permits the working fluid to be heated. This configuration makes it possible to save the electricity charges.

In the present invention, the wire electrical discharge machine may further include a control device configured to control operation of the heating device, and may be constructed such that when the workpiece to be machined, selected by an operator, is formed of a material containing magnesium, the control device permits the working fluid to be heated. This configuration makes it possible to save the electricity charges.

According to the present invention, since the working fluid contained in the filter can be heated, it is possible to react the machined swarf adhered to the filter with the heated working fluid. This machined swarf which has reacted with the heated working fluid becomes unlikely to oxidize. It is hence possible to prevent ignition of the filter even when the filter is dried.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Referring now to the accompanying drawings, the wire electrical discharge machines according to the present invention will be described in detail with reference to preferred embodiments.

Figure 1:
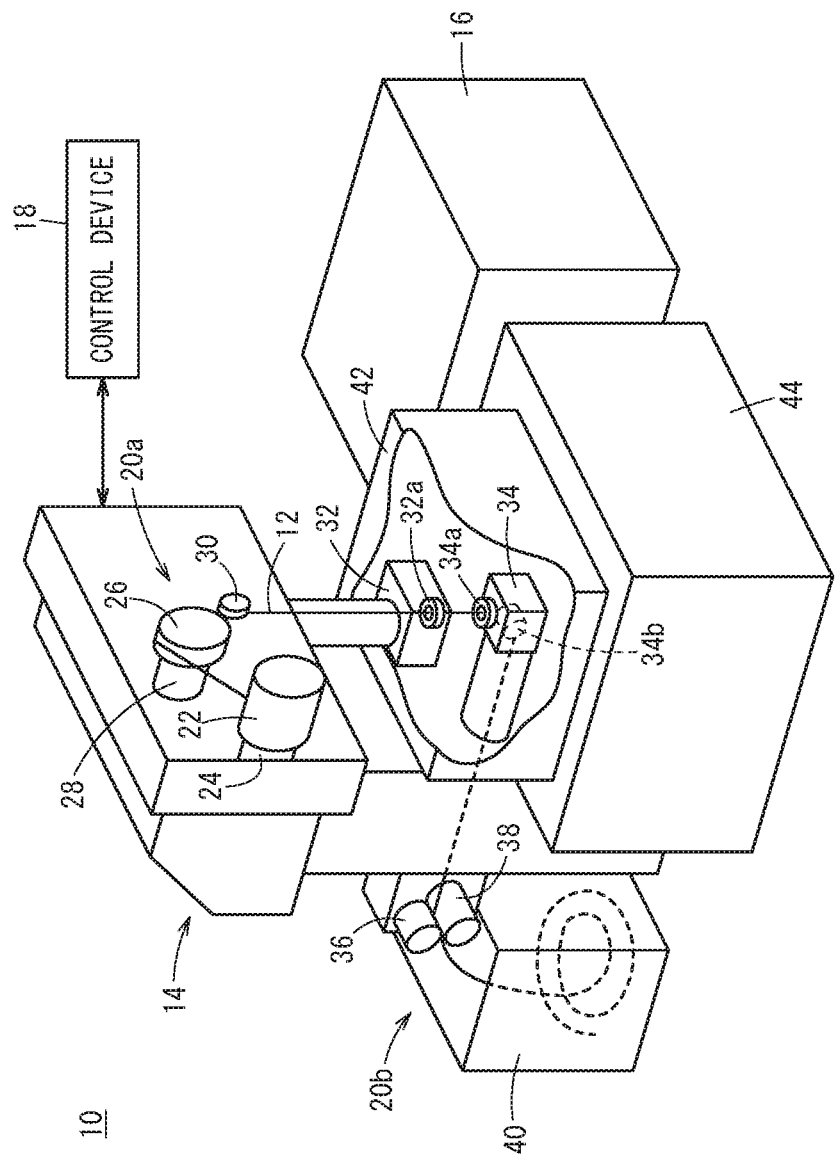
FIG. 1 is a schematic diagram showing a configuration of a wire electrical discharge machine according to an embodiment.

FIG. 1 is a schematic configuration diagram of a wire electrical discharge machine 10. The wire electrical discharge machine 10 is a machine tool that performs electrical discharge machining on an unillustrated object to be machined (workpiece) in a dielectric working fluid by electric discharge generated between a wire electrode 12 and the workpiece. The wire electrical discharge machine 10 includes a main machining body 14, a working fluid processing unit (dielectric fluid unit) 16 and a control device 18.

The wire electrode 12 is formed of, for example, tungsten-based, copper alloy-based, brass-based metal or the like. On the other hand, the material of the workpiece is, for example, a metal material such as an iron-based material or a super-hard material (e.g., tungsten carbide) and is assumed to contain, at least, magnesium in the present embodiment. In the present embodiment, when objects to be machined are mentioned to contain at least magnesium, they may include workpieces formed of magnesium only.

The main machining body 14 includes a supply system 20a for supplying the wire electrode 12 toward the workpiece and a collecting system 20b for collecting the wire electrode 12 from the workpiece.

The supply system 20a includes a wire bobbin 22 on which the wire electrode 12 is wound, a torque motor 24 for applying torque to the wire bobbin 22, a brake shoe 26 for applying braking friction to the wire electrode 12, a braking motor 28 for applying braking torque to the brake shoe 26, a tension detector 30 for detecting the tension of the wire electrode 12 and an upper wire guide 32 for guiding the wire electrode 12.

The collecting system 20b includes a lower wire guide 34 for guiding the wire electrode 12, a pinch roller 36 and feed roller 38 capable of holding the wire electrode 12 therebetween and a wire collection box 40 for collecting the wire electrode 12 conveyed by the pinch roller 36 and the feed roller 38.

The main machining body 14 has a work tank (work-pan) 42 capable of storing a working fluid (dielectric working fluid) of deionized water used in electrical discharge machining with the upper wire guide 32 and the lower wire guide 34 arranged therein. The work tank 42 is mounted on a base 44. The workpiece is placed between the upper wire guide 32 and the lower wire guide 34. The upper wire guide 32 and the lower wire guide 34 respectively have die guides 32a and 34a for supporting the wire electrode 12. The lower wire guide 34 includes a guide roller 34b that guides the wire electrode 12 to the pinch roller 36 and the feed roller 38 by deflecting the travel of the wire electrode 12.

The workpiece is supported by a table (not shown) provided on the base 44. This table is disposed inside the work tank 42. The main machining body 14 (wire electrical discharge machine 10) machines the workpiece by relatively moving the position of the table and the position of the wire electrode 12 supported by the die guides 32a, 34a.

The working fluid processing unit 16 is a device that removes machined swarf (chips or sludge) produced in the work tank 42 and manages the quality of the working fluid by adjusting the electric resistivity and temperature and the like. The working fluid processing unit 16 will be described later in detail. The control device 18 controls the main machining body 14 and the working fluid processing unit 16. The control device 18 will also be briefly described later.

Figure 2:
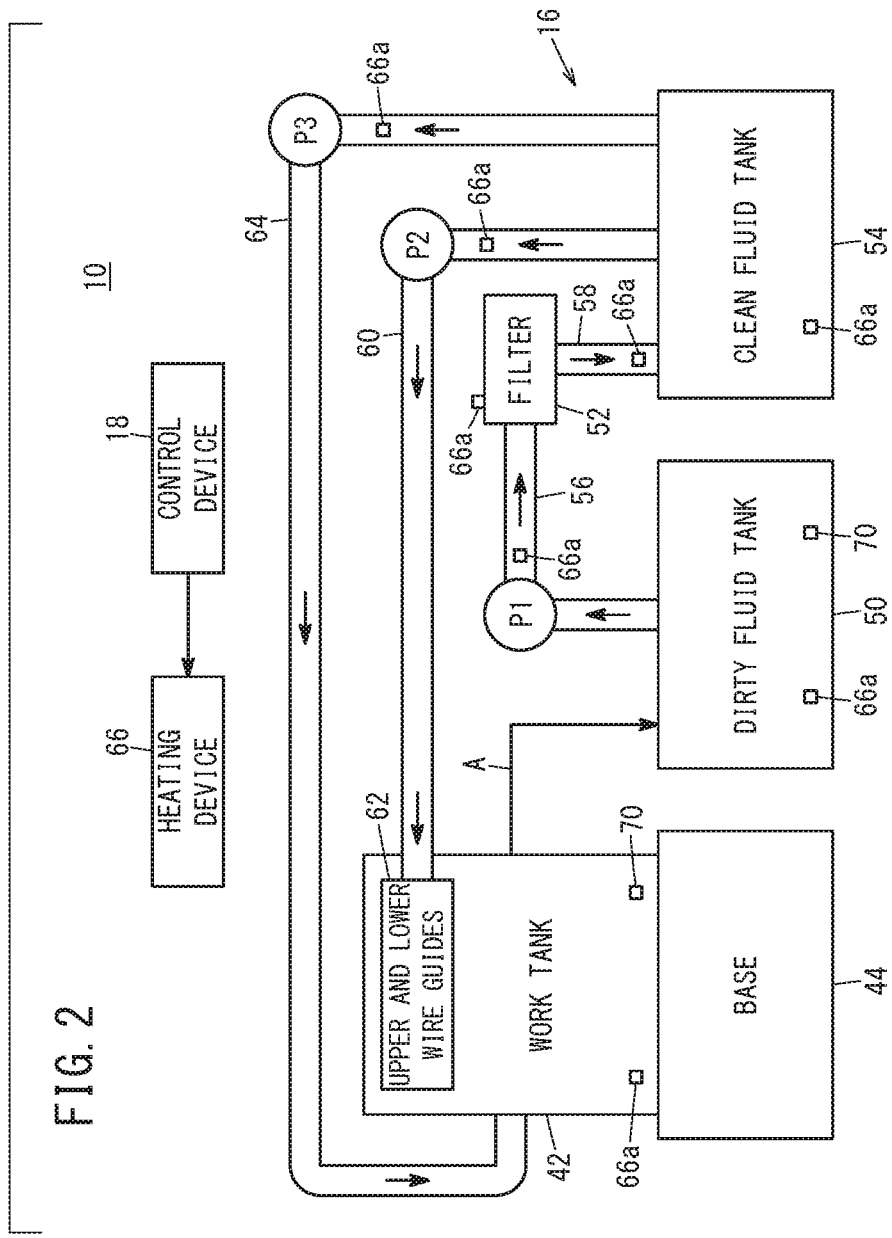
FIG. 2 is a diagram showing essential components of the wire electrical discharge machine according to the embodiment.

FIG. 2 is a diagram showing a configuration of essential components of the wire electrical discharge machine 10, in particular, a configuration of the working fluid processing unit 16. The working fluid processing unit 16 includes at least a dirty fluid tank 50, a filter 52 and a clean fluid tank 54. The dirty fluid tank 50 temporarily stores the working fluid discharged from the work tank 42. Here, since machined swarf produced by electrical discharge machining is mixed in the working fluid in the work tank 42, the working fluid discharged from the work tank 42 to the dirty fluid tank 50 contains machined swarf. That is, the dirty fluid tank 50 temporarily stores the working fluid contaminated by machined swarf. The work tank 42 is configured to flow out (discharge) the stored working fluid to the dirty fluid tank 50 as indicated by reference symbol A. Since the workpiece is formed of material containing magnesium, the machined swarf also contains magnesium.

The working fluid stored in the dirty fluid tank 50 is pumped up by a pump P1 and supplied to the filter 52 through a duct (piping) 56. The duct 56 connects the dirty fluid tank 50 and the filter 52 so as to flow the working fluid from the dirty fluid tank 50 to the filter 52. The pump P1 is provided in the duct 56. The working fluid filtered by the filter 52 (working fluid having passed through the filter 52) is sent to the clean fluid tank 54 through a duct (piping) 58. The duct 58 connects the filter 52 and the clean fluid tank 54, and flows the working fluid having passed through the filter 52 to the clean fluid tank 54. The filter 52 is to remove machined swarf from the working fluid. Since the working fluid from the dirty fluid tank 50 is passed to the clean fluid tank 54 through the filter 52, the working fluid with machined swarf removed can be sent to the clean fluid tank 54.

The clean fluid tank 54 temporarily stores the working fluid with machined swarf removed. The working fluid stored in the clean fluid tank 54 is pumped up by a pump P2 and supplied to upper and lower wire guides 62 through a duct (piping) 60. The upper and lower wire guides 62 are a general term for the upper wire guide 32 and the lower wire guide 34. The upper and lower wire guides 62 (at least the upper wire guide 32) eject the supplied working fluid with swarf removed. In this way, performing electrical discharge machining while ejecting the working fluid from the upper and lower wire guides 62, makes it possible to fill the gap between the wire electrode 12 and the workpiece with a clean working fluid suitable for electrical discharge machining, whereby it is possible to prevent the accuracy of the electrical discharge machining from being lowered due to machined swarf.

Further, the working fluid stored in the clean fluid tank 54 is pumped up by a pump P3 to be supplied to the work tank 42 through a duct (piping) 64. The pumps P1 to P3 are driven under the control of the control device 18.

The wire electrical discharge machine 10 (working fluid processing unit 16) includes a heating device 66 for heating the working fluid. The heating device 66 heats the working fluid by at least one of the components that store or flow therethrough the working fluid containing machined swarf, i.e., the work tank 42 dirty fluid tank 50, filter 52 and duct 56. The heating device 66 may heat the working fluid in at least one of the clean fluid tank 54 and the ducts 58, 60, 64 that store or flow therethrough the working fluid without containing machined swarf.

The heating device 66 has at least one heating element 66a formed of a heater, a hot air blower, a high-frequency heater or the like and heats the working fluid by use of at least one or more heating elements 66a. For example, when heating the working fluid in the work tank 42, the heating element 66a is arranged in the work tank 42. Likewise, when the working fluid is heated in the dirty fluid tank 50, the clean fluid tank 54, the ducts 56, 58, 60 or 64, the heating element 66a is arranged in the dirty fluid tank 50, the clean fluid tank 54, the ducts 56, 58, 60 or 64. Further, when the working fluid contained in the filter 52 is heated, the heating element 66a is provided in the filter 52 or in the vicinity thereof.

Heating the working fluid to hot water (for example, 60 degrees or higher) makes the machined swarf containing magnesium react with hot water and change into machined swarf of magnesium hydroxide. Magnesium hydroxide is a substance that is hardly soluble in water and has low reactivity. Therefore, by changing the machined swarf of magnesium into machined swarf of magnesium hydroxide, the machined swarf becomes unlikely to oxidize (machined swarf becomes unlikely to react with oxygen ($O_2$) or carbon dioxide ($CO_2$) in the air) even if there is no water around the machined swarf, hence there is no risk of ignition. Thus, the filter 52 can be replaced safely. The reaction formula of magnesium hydroxide is as follows:

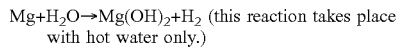

$Mg+H_2O \rightarrow Mg(OH)_2+H_2$ (this reaction takes place with hot water only.)

The heating device 66 heats the working fluid to such a temperature that the temperature of the working fluid becomes equal to or higher than a predetermined temperature Tm. The predetermined temperature Tm is a temperature (for example, 60 degrees.) at which at least magnesium contained in the machined swarf in the working fluid changes to magnesium hydroxide. The temperature of the working fluid means the temperature of working fluid, at least, at or around the place only where the working fluid is heated but does not mean the temperature of the whole working fluid in the wire electrical discharge machine 10. For example, in the case of heating the working fluid in the work tank 42 or the dirty fluid tank 50, it means heating until the temperature of the working fluid in the work tank 42 or the dirty fluid tank 50 reaches the predetermined temperature Tm or higher. Further, in the case of heating the working fluid in the duct 56, it means heating until the temperature of the working fluid in the duct 56 reaches a predetermined temperature Tm or higher.

Figure 3:
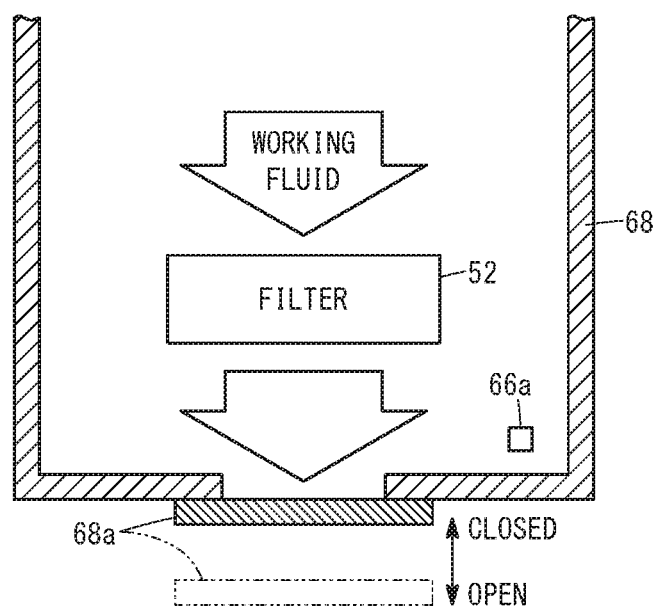
FIG. 3 is a diagram showing an example in which the periphery of the filter shown in FIG. 2 is heated to hot up a working fluid contained in the filter.

FIG. 3 is a diagram showing an example of heating the working fluid contained in the filter 52 by heating the periphery of the filter 52. The wire electrical discharge machine 10 is provided with a tank (storage tank) 68 holding the filter 52. The tank 68 temporarily stores the working fluid and stores the working fluid so as to immerse, at least, part of the filter 52. The tank 68 has a shutter 68a that switches whether or not to store the working fluid. The shutter 68a is opened and closed by an actuator (not shown) under the control of the control device 18.

When the shutter 68a is open, the working fluid having passed through the filter 52 is supplied to the clean fluid tank 54 through the duct 58. When the shutter 68a is closed, the working fluid having passed through the filter 52 accumulates in the tank 68. In the case where the working fluid contained in the filter 52 is not heated, that is, in a normal state, the control device 18 puts the shutter 68a in an opened state via the actuator. When heating the working fluid contained in the filter 52, the control device causes the actuator to close the shutter 68a. By heating the working fluid with the shutter 68a closed and the filter 52 immersed therein, the working fluid stored in the tank 68 is heated. As a result, machined swarf containing fine magnesium particles adhering to the filter 52 reacts with hot water to produce machined swarf of magnesium hydroxide. Herein, the heating element 66a for heating the working fluid contained in the filter 52 is arranged in the tank 68.

The wire electrical discharge machine 10 includes a concentration detector 70 that detects the concentration of the machined swarf in the working fluid. The concentration detector 70 is provided in at least one of the work tank 42 and the dirty fluid tank 50. The detection signal (concentration value of the machined swarf) detected by the concentration detector 70 is sent to the control device 18. As the concentration detector 70, for example, a sensor that detects the concentration of magnesium such as an absorption photometer, an ion counter and the like, may be used.

Figure 4:
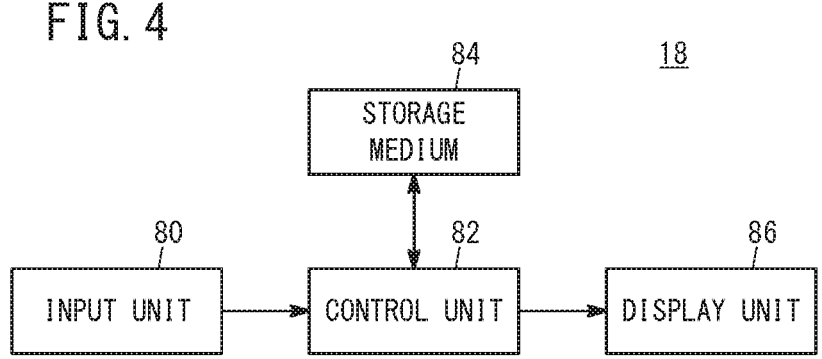
FIG. 4 is a block diagram showing a control device shown in FIG. 2.

FIG. 4 is a block diagram of the control device 18. The control device 18 includes an input unit 80, a control unit 82, a storage medium 84 and a display unit 86. The input unit 80 is an operation unit operated by an operator to input information, commands and others. The input unit 80 may be composed of ten keys for numeric data entry, various function keys (for example, a power button, etc.), a keyboard, a touch panel and the like. The control unit 82 includes a processor such as a CPU or the like and a memory chip storing a program. When running this program, the processor provides the function of the control unit 82 of the present embodiment. The storage medium 84 has stored data and the like necessary for control by the control unit 82 and also functions as a buffer memory. The display unit 86 is configured of a liquid crystal display, an organic EL display or the like and displays necessary information and the like. The touch panel of the input unit 80 is provided on the display screen of the display unit 86.

The control unit 82 controls the relative position (relative movement) between the position of the table supporting the workpiece to be machined and the position of the wire electrode 12 supported by the die guides 32a and 34a, and also controls the current flowing through the wire electrode 12. The control device 18 also controls the operation of the pumps P1 to P3 of the working fluid processing unit 16, controls the operation of the heating device 66, open/close control of the shutter 68a and others.

When processing the workpiece, the control unit 82 may constantly drive the heating device 66 to heat the working fluid, but in this case the electricity cost for heating increases and the machining accuracy is lowered due to the temperature rise of the working fluid. Therefore, the control unit 82, using a predetermined condition as a trigger, drives the heating device 66 to heat the working fluid.

Examples of predetermined condition serving as the trigger may include: (1) when an instruction to turn off the power of the wire electrical discharge machine 10 is given through the input unit 80 by the operator; (2) when an instruction to replace the filter 52 is given through the input unit 80 by the operator; (3) when the concentration of machined swarf detected by the concentration detector 70 is equal to or higher than a threshold value; (4) an alarm for stopping the operation of the wire electrical discharge machine 10 is raised; (5) when a machining condition for machining a workpiece containing magnesium is selected through the input unit 80 by the operator; and (6) when a magnesium-containing material is selected as the material of the workpiece through the input unit 80 by the operator.

When the wire electrical discharge machine 10 is deactivated, the content of the working fluid in the filter 52 with fine machined swarf attached thereto decreases, and the machined swarf reacts with oxygen or carbon dioxide in the air and is oxidized. Therefore, with the above (1) or (4) as a trigger, the control unit 82 controls the heating device 66 to heat the working fluid. This makes the magnesium contained in the fine machined swarf adhered to the filter 52 change to magnesium dioxide, which is unlikely to oxidize. When the heating of the working fluid is completed, the control device 18 turns off the power of the wire electrical discharge machine 10.

Upon replacement of the filter 52, the content of the working fluid in the replaced used filter 52 decreases, and the fine machined swarf attached to the filter 52 reacts with oxygen or carbon dioxide in the air and is oxidized. Therefore, with the above (2) as a trigger, the control unit 82 controls the heating device 66 to heat the working fluid. When the heating of the working fluid is completed, the control device 18 displays on the display unit 86 that the filter 52 is replaceable. Thus, the operator will replace the filter 52 only after the heating of the working fluid is completed. Since the magnesium content in the machined swarf adhered to the exhausted filter 52 taken out by replacement has changed to magnesium dioxide, which is unlikely to oxidize. In this case, while heating the working fluid the control device 18 may control the display unit 86 to give such display as "Please suspend replacement of the filter until heating is completed".

In addition, when the concentration of the machined swarf contained in the working fluid is lower than the threshold value, oxidation of the machined swarf will not cause any problem. Therefore, with the trigger (3) as a trigger, the control unit 82 controls the heating device 66 to heat the working fluid.

As to the timing of termination of the heating of the working fluid, heating of the working fluid may be terminated after a lapse of a predetermined time (constant time) Ti from the start thereof. This predetermined time Ti is a time required for the working fluid to reach, at least, the predetermined temperature Tm. Alternatively, a temperature detector for detecting the temperature of the working fluid may be provided for the wire electrical discharge machine 10 so that when the temperature detected by the temperature detector becomes equal to or higher than a predetermined temperature Tm (e.g., 60 degrees) heating of the working fluid can be terminated.

In the case where magnesium is not contained in the workpiece to be machined, there is no need to heat the working fluid, so the control unit 82 permits or controls the heating device 66 to heat the working fluid in accordance with the above (5), (6) as a trigger. Thereby, it is possible to heat the working fluid only when machined swarf containing magnesium is produced. In the case where heating of the working fluid is permitted using the above (5) and (6) as triggers, the control device 18 starts heating the working fluid when any of the above predetermined conditions (1) to (4) is further detected.

A plurality of sensors with alarm functions (not shown) are built in the wire electrical discharge machine 10, and these alarm function-equipped sensors detect malfunction at diverse portions of the wire electrical discharge machine 10 and each give an alarm (for example, an alarm for stopping the operation of the wire electrical discharge machine 10) in according to detection thereof.

Further, it is also possible to allow the operator to operate the input unit 80 and select ON/OFF of the heating function of the working fluid. In this case, the control unit 82 (control device 18) permits heating of the working fluid only when the heating function is on. It is also possible to provide such a configuration that the operator is allowed to operate the input unit 80 and select one or multiple locations and/or sites (e.g., work tank 42, dirty fluid tank 50, duct 56, etc.) to be heated. In this case, the control unit 82 (control device 18) heats the working fluid at the selected location(s). It is further possible to provide such a configuration that the operator is allowed to operate the input unit 80 so as to be able to select either constant heating or performing selective heating only when a predetermined condition is satisfied. The control unit 82 (the control device 18) heats the working fluid according to this selection. It is still possible to provide such a configuration that the operator is allowed to operate the input unit 80 and select, from the above predetermined conditions, one or multiple conditions (1) to (6), based on which heating of the working fluid is carried out. In this case, the control unit 82 (the control device 18) starts heating the working fluid when the selected predetermined condition(s) is(are) satisfied.

VARIATIONAL EXAMPLES

The above embodiment may be modified as follows.

Variational Example 1

Figure 5:
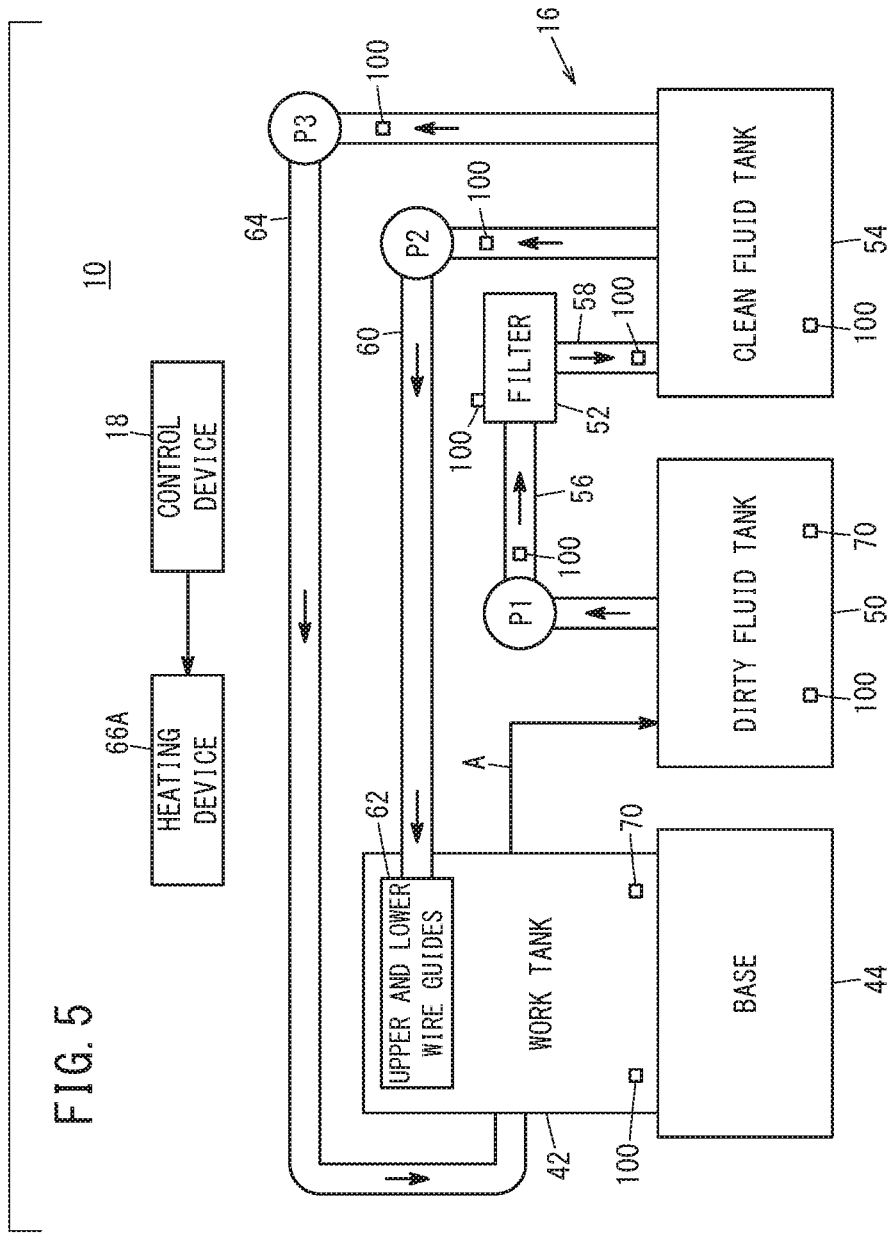
FIG. 5 is a diagram showing essential components of a wire electrical discharge machine according to a variational example 1; and, FIG. 6 is a diagram showing essential components of a wire electrical discharge machine according to a variational example 2.

FIG. 5 is a diagram of essential components of a wire electrical discharge machine 10 of Variational Example 1, in particular, showing a configuration of a working fluid processing unit 16. Here, the same components as those in the above embodiment are allotted with the same reference numerals, and only different components will be explained. A heating device 66A of Variational Example 1 supplies fresh working fluid heated at high temperature (which may be referred to as a heated fresh working fluid) to the wire electrical discharge machine 10, to thereby heat the working fluid of the wire electrical discharge machine 10. This is the point different from the above embodiment.

The heating device 66A has one or more nozzles 100, and supplies heated fresh working fluid from the one or multiple nozzles 100 to the wire electrical discharge machine 10. The heating device 66A heats the working fluid in at least one of the work tank 42, dirty fluid tank 50, filter 52 and duct 56, and heats the working fluid in at least one of the clean fluid tank 54 and ducts 58, 60 and 64, as required.

Therefore, the nozzle 100 of the heating device 66A is provided in at least one of the work tank 42, dirty fluid tank 50, duct 56 and tank 68. Further, if necessary, the nozzle 100 may be provided in at least one of the clean fluid tank 54, ducts 58, 60 and 64. Further, in the case of heating the working fluid contained in the filter 52, the nozzle 100 is provided in the vicinity of the filter 52.

When heating the working fluid in the work tank 42, the heating device 66A ejects heated fresh working fluid from the nozzle 100 provided in the work tank 42. As a result, the working fluid existing in the work tank 42 and the supplied heated fresh working fluid are mixed, whereby the temperature of the working fluid in the work tank 42 rises. Similarly, in the case of heating the working fluid in the dirty fluid tank 50, clean fluid tank 54, ducts 56, 58, 60 and 64, the heating device 66A ejects the heated fresh working fluid from the nozzle 100 provided in the work tank 42. As a result, the temperature of the working fluid in the dirty fluid tank 50, clean fluid tank 54, ducts 56, 58, 60 and 64 rises.

When heating the working fluid contained in the filter 52, the heated fresh working fluid is ejected from the nozzle 100 provided in the tank 68, thereby raising the temperature of the working fluid contained in the filter 52. It goes without saying that the shutter 68a of the tank 68 is in a closed state when the heated fresh working fluid is ejected from the nozzle 100 provided in the tank 68.

The temperature of the heated fresh working fluid ejected from the nozzle 100 is higher than the temperature of the working fluid (the working fluid existing originally) of the wire electrical discharge machine 10 and is equal to or higher than a predetermined temperature Tm (e.g., 60 degrees).

In this way, since the heated fresh working fluid is supplied to the wire electrical discharge machine 10, it is possible to heat the working fluid of the wire electrical discharge machine 10 and reduce the concentration of the machined swarf contained in the working fluid of the wire electrical discharge machine 10.

When the heated fresh working fluid is supplied to the wire electrical discharge machine 10 by the heating device 66A, the amount of working fluid in the wire electrical discharge machine 10 increases. Therefore, an unillustrated pump may be used to discharge the working fluid of the wire electrical discharge machine 10. In this case, it is preferable to make the place where the working fluid is discharged different from the place where the heated fresh working fluid is supplied. For example, if the heated fresh working fluid is supplied to the dirty fluid tank 50, the working fluid in a place other than the dirty fluid tank 50 (for example, the work tank 42, the clean fluid tank 54, etc.) is discharged.

Varietal Example 2

Figure 6:
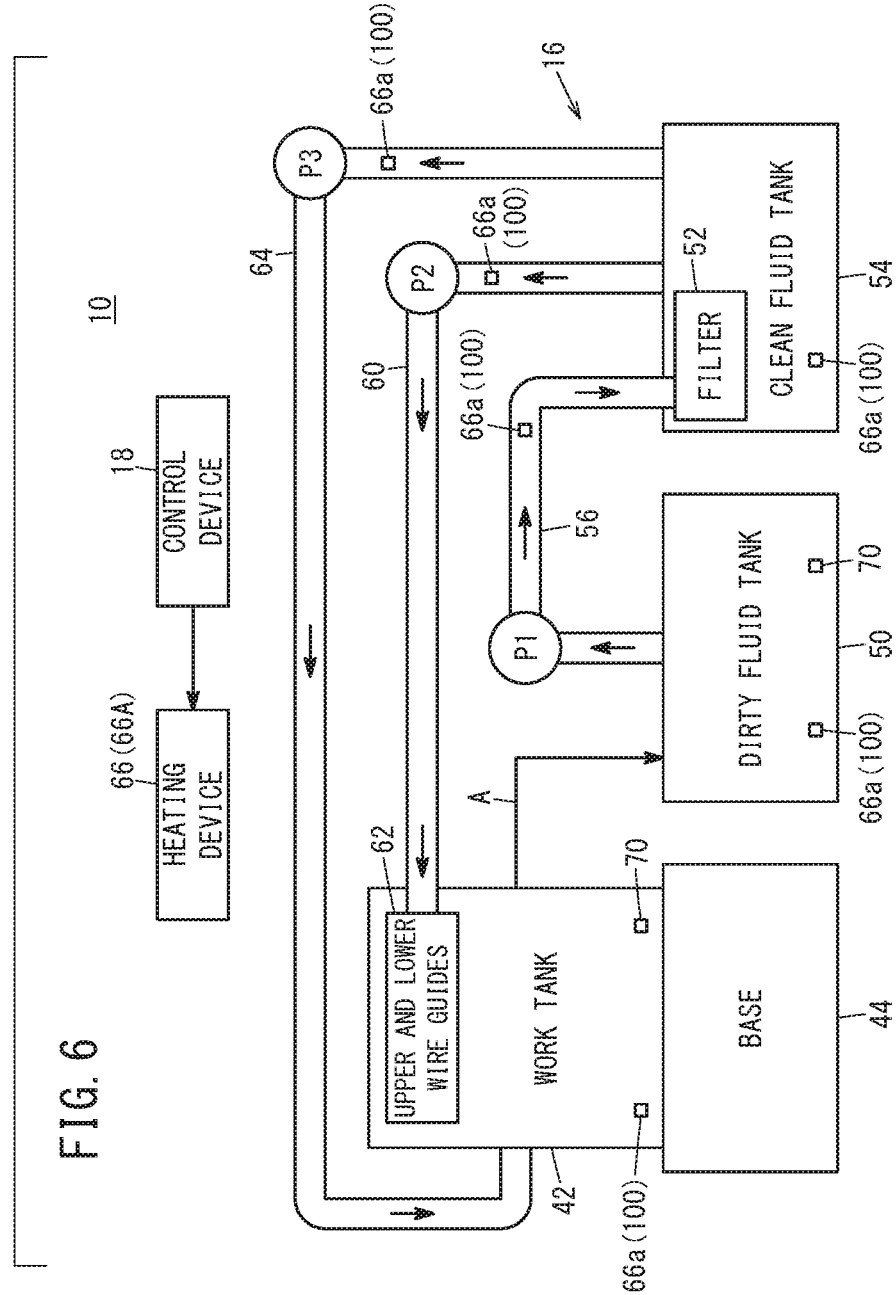

FIG. 6 is a diagram of essential components of a wire electrical discharge machine 10 of Variational Example 2, in particular, showing a configuration of a working fluid processing unit 16. Here, the same components as those in the above embodiment and the above Variational Example 1 are allotted with the same reference numerals, and only different components will be explained. Variational Example 2 is different from the above embodiment modes in that a filter 52 is immersed in the clean fluid tank 54. That is, in Variational Example 2, the clean fluid tank 54 forms a storage tank accommodating the filter 52.

As described above, the working fluid stored in the dirty fluid tank 50 is conveyed through the duct 56 by the pump P1 to the filter 52 accommodated in the clean fluid tank 54. The working fluid filtered by the filter 52 (the working fluid from which machined swarf has been removed) is stored in the clean fluid tank 54. The filter 52 is immersed by the working fluid stored in the clean fluid tank 54. The swarf-removed working fluid stored in the clean fluid tank 54 is pumped up by the pumps P2 and P3 and is supplied to the work tank 42 through the ducts 60 and 64.

In this manner, since the filter 52 is arranged in the clean fluid tank 54 and immersed in the working fluid stored therein, the tank 68 as described in the above embodiment is not required, and the heating element 66a (nozzle 100) does not need to be provided in the tank 68 either. That is, when heating the working fluid contained in the filter 52 is wanted, the working fluid stored in the clean fluid tank 54 may be heated. This arrangement makes it possible to simplify the configuration of the wire electrical discharge machine 10 (working fluid processing unit 16), hence reduce the cost.

Though, in the above-described embodiment and Variational Examples 1 and 2, the working fluid processing unit 16 is controlled by the control device 18, the working fluid processing unit 16 may be controlled by an external control device other than the wire electrical discharge machine 10.

As described above, the wire electrical discharge machine 10 described in any of the above-described embodiment and Variational Examples 1 and 2, includes a filter 52 for removing machined swarf produced by electrical discharge machining from the working fluid and a heating device 66 (or 66A) for heating the working fluid stored inside the filter 52. This configuration makes it possible to heat the working fluid contained in the filter 52, whereby it is possible to cause reaction between the machined swarf adhered to the filter 52 and the heated working fluid. The machined swarf which has reacted with this heated working fluid becomes unlikely to oxidize. It is hence possible to prevent ignition of the filter 52 even when the filter 52 is dried.

The wire electrical discharge machine 10 may include a storage tank (a clean fluid tank 54 or a tank 68) accommodating the filter 52, and the heating device 66 (or 66A) may heat the working fluid stored in the storage tank (the clean fluid tank 54 or the tank 68). Accordingly, when the working fluid stored in the storage tank (the clean fluid tank 54 or the tank 68) is heated, it is possible to easily heat the working fluid stored inside the filter 52.

The wire electrical discharge machine 10 may further include a work tank 42 for storing the working fluid for electrical discharge machining, a dirty fluid tank 50 for temporarily storing the working fluid containing machined swarf, discharged from the work tank 42, a duct 56 for connecting the dirty fluid tank 50 and a filter 52 to flow the working fluid from the dirty fluid tank 50 to the filter 52. The heating device 66 (or 66A) may heat the stored working fluid containing machined swarf in at least one of the work tank 42 and the dirty fluid tank 50. Also, the heating device 66 (or 66A) may also heat the working fluid in the duct 56. Since these configurations make it possible to heat the working fluid containing machined swarf before the working fluid containing machined swarf flows into the filter 52, only the machined swarf that is hardly oxidized adheres to the filter 52. As a result, it is possible to prevent the filter 52 from igniting even if the filter 52 is dried.

The storage tank (tank 68) may be equipped with a shutter 68a configured so as to either store or not store the working fluid and may store the working fluid therein by closing the shutter 68a at the time of heating by the heating device 66 (or 66A) so as to immerse the filter 52 in the working fluid. In this way, since the working fluid contained in the filter 52 can be heated easily, it is possible to react the machined swarf adhered to the filter 52 with the heated working fluid.

The storage tank may be a clean fluid tank 54 that stores the working fluid from which the machined swarf has been removed by the filter 52. This makes it easy to heat the working fluid contained in the filter 52, so that the machined swarf adhered to the filter 52 can be reacted with the heated working fluid. Further, the configuration of the wire electrical discharge machine 10 can be simplified, leading to a reduced cost.

The heating device 66 (or 66A) may heat the working fluid up to, at least a predetermined temperature Tm at which magnesium contained in the machined swarf in the working fluid changes to magnesium hydroxide. This makes it possible to reliably prevent the machined swarf from being oxidized, and provide reliable prevention against ignition of the filter 52.

The heating device 66 may include a heating element 66a to heat the working fluid using the heat therefrom. Thereby, it is possible to heat the working fluid easily.

The heating device 66A may heat the working fluid in the wire electrical discharge machine 10 by supplying the working fluid having a temperature equal to or higher than a predetermined temperature Tm, which is higher than the temperature of the working fluid in the wire electrical discharge machine (10), to the wire electrical discharge machine (10). This configuration makes it possible to easily heat the working fluid and also reduce the concentration of the machined swarf content in the working fluid of the wire electrical discharge machine 10.

The wire electrical discharge machine 10 may further include a control device 18 that controls the operation of the heating device 66 (or 66A). In this configuration, the control device 18 may be constructed such that when the operator performs control of turning off the power to the wire electrical discharge machine 10, the control device 18 actuates the heating device 66 (or 66A) to start heating the working fluid, and then, when a predetermined time Ti elapses from the start of heating, or when the temperature of the working fluid reaches the predetermined temperature Tm or higher, the control device 18 stops the operation of the heating device 66 (or 66A) to terminate the heating of the working fluid and turns off the power to the wire electrical discharge machine 10. This configuration makes it possible to prevent ignition of the filter 52 even when the filter 52 is dried by turning off the power supply. Further, it is possible to save the electricity charges and prevent the machining accuracy in electrical discharge machining from being lowered by the heating of the working fluid.

The control device 18 may be constructed such that when the operator performs control of giving instructions to replace the filter 52, the control device 18 actuates the heating device 66 (or 66A) to start heating the working fluid, and when a predetermined time Ti elapses from the start of heating, or when the temperature of the working fluid reaches a predetermined temperature Tm or higher, the control device 18 stops the operation of the heating device 66 (or 66A) to terminate the heating of the working fluid and notifies the operator that the filter 52 can be replaced, by displaying the effect on the display unit 86. Thus, the filter 52 is replaced after being heated, so that the used filter 52 taken out by replacement can be prevented from igniting as a result of being dried. Further, it is possible to save the electricity charges and prevent the machining accuracy in electrical discharge machining from being lowered by the heating of the working fluid.

The wire electrical discharge machine 10 may further include a concentration detector 70 that detects the concentration of the machined swarf content in the working fluid. In this configuration, the control device 18 may be constructed such that when the concentration detector 70 detects a concentration equal to or higher than a threshold, the control device 18 actuates the heating device 66 (or 66A) to start heating of the working fluid, and when a predetermined time Ti elapses from the start of heating, or when the temperature of the working fluid reaches a predetermined temperature Tm or higher, the control device 18 stops the operation of the heating device 66 (or 66A) to terminate the heating of the working fluid. In this way, since the working fluid is heated only when there is a risk of the filter 52 igniting unless the working fluid is heated, it is possible to save the electricity charges and prevent the machining accuracy in electrical discharge machining from being lowered by the heating of the working fluid.

The control device 18 may be constructed such that when an alarm for stopping the operation of the wire electrical discharge machine 10 is raised, the control device 18 actuates the heating device 66 (or 66A) to start heating of the working fluid, and when a predetermined time Ti elapses from the start of heating, or when the temperature of the working fluid reaches a predetermined temperature Tm or higher, the control device 18 stops the operation of the heating device 66 (or 66A) to terminate the heating of the working fluid. This configuration makes it possible to prevent ignition of the filter 52 even when the filter 52 is dried by turning off the power supply. Further, it is possible to save the electricity charges and prevent the machining accuracy in electrical discharge machining from being lowered by the heating of the working fluid.

When a machining condition for machining a workpiece containing magnesium is selected by an operator, the control device 18 may permit the working fluid to be heated. Also, when a workpiece to be machined, selected by an operator, is formed of a material containing magnesium, the control device 18 may permit the working fluid to be heated. This configuration makes it possible to save the electricity charges. That is, because when the workpiece to be machined does not contain magnesium the machined swarf does not contain magnesium either, it is not necessary to heat the working fluid.

What is claimed is:

1. A wire electrical discharge machine for performing electrical discharge machining on a workpiece to be machined in a working fluid of deionized water, comprising:
   a filter configured to remove machined swarf produced by electrical discharge machining from the working fluid;
   a heating device configured to heat the working fluid stored inside the filter, wherein the heating device is configured to heat the working fluid up to, at least, a predetermined temperature at which magnesium contained in the machined swarf in the working fluid changes to magnesium hydroxide;
   a storage tank configured to accommodate the filter;
   a work tank configured to store the working fluid to perform electrical discharge machining;
   a dirty fluid tank configured to temporarily store the working fluid containing the machined swarf discharged from the work tank; and a duct configured to connect the dirty fluid tank and the filter in order to flow the working fluid from the dirty fluid tank to the filter, wherein the heating device is configured to heat the working fluid stored in the storage tank, the heating device is configured to further heat the working fluid in the duct.

2. The wire electrical discharge machine according to claim 1, wherein the storage tank includes a shutter configured to either store or not store the working fluid, and is configured to store the working fluid therein by closing the shutter at time of heating by the heating device so as to immerse the filter in the working fluid.

3. The wire electrical discharge machine according to claim 1, wherein the storage tank is a clean fluid tank configured to store the working fluid with the machined swarf removed by the filter.

4. The wire electrical discharge machine according to claim 1, further comprising:
wherein the heating device is configured to heat the working fluid containing the machined swarf, stored in, at least, one of the work tank and the dirty fluid tank.

5. The wire electrical discharge machine according to claim 1, wherein the heating device includes a heating element configured to heat the working fluid using heat from the heating element.

6. The wire electrical discharge machine according to claim 1, wherein the heating device is configured to heat the working fluid in the wire electrical discharge machine by supplying the working fluid having a temperature equal to or higher than a predetermined temperature, which is higher than a temperature of the working fluid in the wire electrical discharge machine, to the wire electrical discharge machine.

7. The wire electrical discharge machine according to claim 1, further comprising a control device configured to control operation of the heating device,
wherein when an operator performs control of turning off power to the wire electrical discharge machine, the control device is configured to actuate the heating device to start heating the working fluid, and when a predetermined time elapses from start of heating, the control device is configured to stop the operation of the heating device to terminate heating of the working fluid and is configured to turn off the power to the wire electrical discharge machine.

8. The wire electrical discharge machine according to claim 1, further comprising a control device configured to control operation of the heating device,
wherein when an operator performs control of giving an instruction to replace the filter, the control device is configured to actuate the heating device to start heating the working fluid, and when a predetermined time elapses from start of heating, the control device is configured to stop the operation of the heating device to terminate the heating of the working fluid and is configured to notify the operator that the filter can be replaced.

9. The wire electrical discharge machine according to claim 1, further comprising:
a control device configured to control operation of the heating device; and
a concentration detector configured to detect concentration of machined swarf in the working fluid,
wherein when the concentration detector detects a concentration equal to or higher than a threshold, the control device is configured to actuate the heating device to start heating of the working fluid, and when a predetermined time elapses from start of heating, the control device is configured to stop the operation of the heating device to terminate the heating of the working fluid.

10. The wire electrical discharge machine according to claim 1, further comprising a control device configured to control operation of the heating device,
wherein when an alarm for stopping operation of the wire electrical discharge machine is raised, the control device is configured to actuate the heating device to start heating of the working fluid, and when a predetermined time elapses from start of heating, the control device is configured to stop the operation of the heating device to terminate the heating of the working fluid.

11. The wire electrical discharge machine according to claim 1, further comprising a control device configured to control operation of the heating device,
wherein when a machining condition for machining the workpiece containing magnesium is selected by an operator, the control device permits the working fluid to be heated.

12. The wire electrical discharge machine according to claim 1, further comprising a control device configured to control operation of the heating device,
wherein when the workpiece to be machined, selected by an operator, is formed of a material containing magnesium, the control device permits the working fluid to be heated.

13. A wire electrical discharge machine for performing electrical discharge machining on a workpiece to be machined in a working fluid of deionized water, comprising:
a filter configured to remove machined swarf produced by electrical discharge machining from the working fluid;
a heating device configured to heat the working fluid stored inside the filter, wherein the heating device is configured to heat the working fluid up to, at least, a predetermined temperature at which magnesium contained in the machined swarf in the working fluid changes to magnesium hydroxide; and
a storage tank configured to accommodate the filter,
wherein the heating device is configured to heat the working fluid stored in the storage tank,
the storage tank includes a shutter configured to either store or not store the working fluid, and is configured to store the working fluid therein by closing the shutter at time of heating by the heating device so as to immerse the filter in the working fluid.

14. The wire electrical discharge machine according to claim 13, further comprising:
a work tank configured to store the working fluid in order to perform electrical discharge machining; and
a dirty fluid tank configured to temporarily store the working fluid containing the machined swarf, discharged from the work tank,
wherein the heating device is configured to heat the working fluid containing the machined swarf, stored in, at least, one of the work tank and the dirty fluid tank.

15. The wire electrical discharge machine according to claim 13, further comprising:
a work tank configured to store the working fluid to perform electrical discharge machining;
a dirty fluid tank configured to temporarily store the working fluid containing the machined swarf, discharged from the work tank; and
a duct configured to connect the dirty fluid tank and the filter in order to flow the working fluid from the dirty fluid tank to the filter, wherein the heating device is configured to further heat the working fluid in the duct.

\* \* \* \* \*